US010162484B2

(12) United States Patent
Yamashita et al.

(10) Patent No.: US 10,162,484 B2
(45) Date of Patent: Dec. 25, 2018

(54) INFORMATION-PROCESSING DEVICE, INFORMATION-PROCESSING SYSTEM, STORAGE MEDIUM, AND INFORMATION-PROCESSING METHOD

(71) Applicant: NINTENDO CO., LTD., Kyoto (JP)

(72) Inventors: Yoshikazu Yamashita, Kyoto (JP); Yosuke Oshino, Kyoto (JP); Hideyuki Tatsuta, Kyoto (JP); Noritaka Otsuka, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 204 days.

(21) Appl. No.: 14/887,536

(22) Filed: Oct. 20, 2015

(65) Prior Publication Data

US 2016/0361651 A1 Dec. 15, 2016

(30) Foreign Application Priority Data

Jun. 12, 2015 (JP) ................................ 2015-119550

(51) Int. Cl.
*A63F 13/533* (2014.01)
*G06F 3/0482* (2013.01)
*A63F 13/30* (2014.01)

(52) U.S. Cl.
CPC ............ *G06F 3/0482* (2013.01); *A63F 13/30* (2014.09); *A63F 13/533* (2014.09)

(58) Field of Classification Search
CPC ............................ A63F 13/533; G06F 3/0482
See application file for complete search history.

(56) References Cited

U.S. PATENT DOCUMENTS

2013/0260896 A1* 10/2013 Miura .................... A63F 13/12 463/42
2014/0179425 A1* 6/2014 Perry .................... A63F 13/12 463/31
2014/0274355 A1* 9/2014 George ................. G06Q 30/02 463/29
2015/0121307 A1* 4/2015 Miyahara ............. G06F 3/0482 715/811
2015/0127731 A1* 5/2015 Hamada ................. H04L 67/22 709/204
2016/0127775 A1* 5/2016 Zilberstein ......... G06Q 30/0271 725/34

FOREIGN PATENT DOCUMENTS

JP 2010-134733 6/2010

* cited by examiner

*Primary Examiner* — Damon Pierce
(74) *Attorney, Agent, or Firm* — Nixon & Vanderhye, P.C.

(57) ABSTRACT

A first accepting unit (111) of an exemplary server device (100) accepts from a user an instruction to select one of plural selection targets. A user selecting unit (112) selects, from among plural users other than the user, another user who has recommended or evaluated the selection target, selection of which has been accepted by the first accepting unit (111). A selection target selecting unit (113) selects one or more selection targets that the other user selected by the user selecting unit (112) has recommended or evaluated. A presenting unit (114) presents, to the user, information on the one or more selection targets selected by the selection target selecting unit (113).

19 Claims, 8 Drawing Sheets

121

| COURSE ID | COURSE NAME | CREATOR | RECOMMENDATION LEVEL | NUMBER OF PLAYS |
|---|---|---|---|---|
| STAGE_A | A COURSE | USER_A | 10 | 57 |
| STAGE_B | B COURSE | USER_B | 5 | 24 |
| STAGE_C | C COURSE | USER_C | 0 | 7 |
| ⋮ | ⋮ | ⋮ | ⋮ | ⋮ |

| USER ID | COURSE ID |
|---|---|
| USER_A | STAGE_A, STAGE_B, STAGE_C, STAGE_D ... |
| USER_B | STAGE_E, STAGE_F, STAGE_G, STAGE_H ... |
| USER_C | STAGE_I, STAGE_J, STAGE_K, STAGE_L ... |
| ⋮ | ⋮ |

| COURSE ID | USER ID | COMMENT |
|---|---|---|
| STAGE_A | USER_D | I RECOMMEND IT! |
| STAGE_B | USER_E | EXCITING! |
| STAGE_C | USER_F | SOSO |
| ⋮ | ⋮ | ⋮ |

FIG. 8

INFORMATION-PROCESSING DEVICE, INFORMATION-PROCESSING SYSTEM, STORAGE MEDIUM, AND INFORMATION-PROCESSING METHOD

CROSS REFERENCE TO RELATED APPLICATIONS

The disclosure of Japanese Patent Application No. 2015-119550, filed on Jun. 12, 2015, is incorporated herein by reference.

FIELD

The exemplary embodiment relates to a technique for recommending any of plural selection targets to a user.

BACKGROUND AND SUMMARY

Collaborative filtering is a known technique in the art for inferring contents matching user's preferences from among a lot of contents.

An exemplary embodiment provides an information-processing device, including: a first accepting unit that accepts from a user an instruction to select one of plural selection targets; a user selecting unit that selects, from among plural users other than the user, another user who has recommended or evaluated the selected selection target; a selection target selecting unit that selects one or more selection targets that the other user has recommended or evaluated; and a presenting unit that presents information on the one or more selection targets to the user.

BRIEF DESCRIPTION OF THE DRAWINGS

FIG. 6 shows an example of course information DB 121.

FIG. 7 shows an example of recommendation information DB 122.

FIG. 8 shows an example of comment DB 123.

DETAILED DESCRIPTION OF NON-LIMITING EXAMPLE EMBODIMENTS

1. Exemplary Embodiment

1-1. Configuration

1-1-1. Information-Sharing System 10

Figure 1:
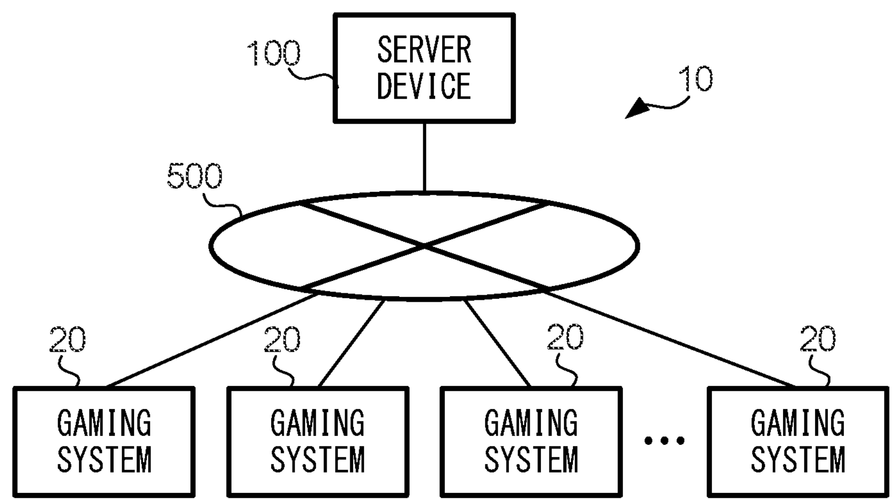
FIG. 1 shows an example configuration of information-sharing system 10.

FIG. 1 is a block diagram showing an example configuration of information-sharing system 10 according to the present exemplary embodiment. Information-sharing system 10 is a system for sharing course data of a game between users of gaming system 20. Information-sharing system 10 includes server device 100 and plural gaming systems 20. Server device 100 and gaming systems 20 are interconnected with each other via network 500. Network 500 may be, for example, the Internet or a wireless local area network (LAN).

1-1-2. Gaming System 20

Figure 2:
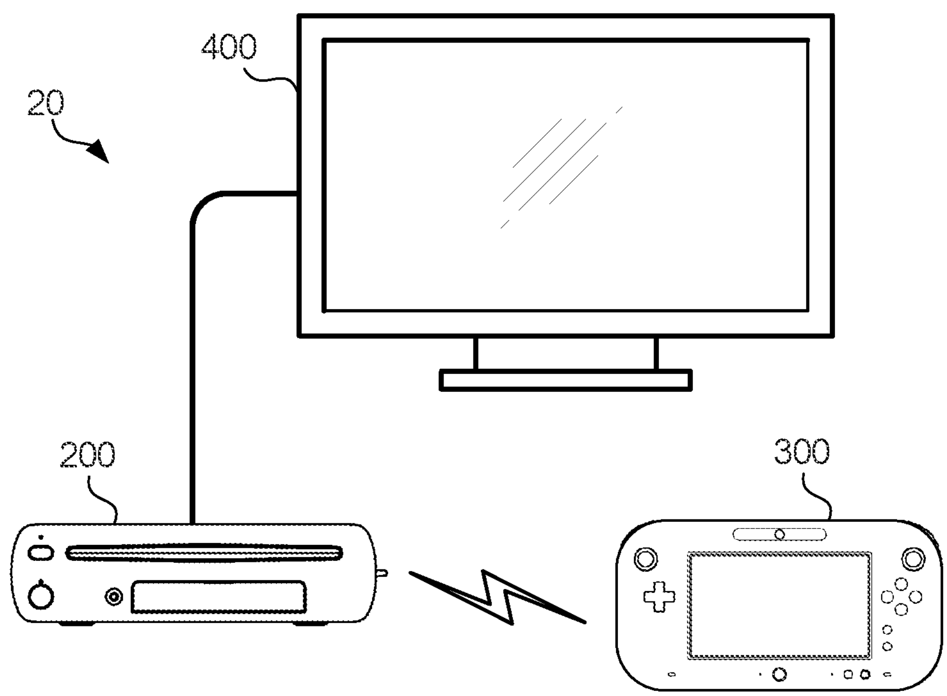
FIG. 2 shows an example configuration of gaming system 20.

FIG. 2 is a diagram showing an example configuration of gaming system 20. Gaming system 20 is an information-processing system for a user to play a game. Gaming system 20 includes main body device 200, controller 300, and TV 400.

Main body device 200 is an information-processing device for executing a game. Main body device 200 controls display of controller 300 and TV 400.

Figure 3:
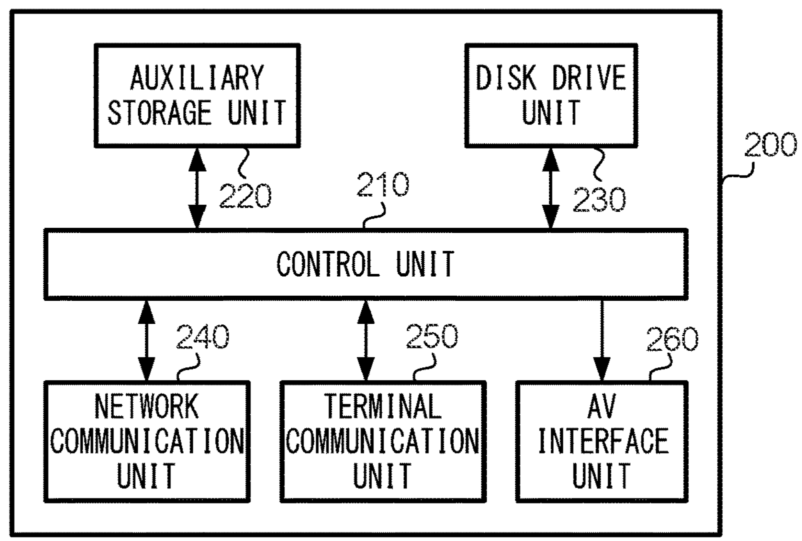
FIG. 3 shows an example of a hardware configuration of main body device 200.

FIG. 3 is a block diagram showing an example of a hardware configuration of main body device 200. Main body device 200 includes control unit 210, auxiliary storage unit 220, disk drive 230, network communication unit 240, terminal communication unit 250, and audio and visual (AV) interface unit 260.

Control unit 210 is a unit for controlling operation of components of main body device 200. Control unit 210 includes a processing unit such as a central processing unit (CPU) or a graphics processing unit (GPU), a memory such as a main memory or a video random access memory (VRAM), and an input-output interface for exchanging information with components of main body device 200. Control unit 210 executes a program to control generation of image data to be sent to controller 300 and TV 400. When doing so, control unit 210 accepts an input from controller 300, performs a processing based on the input, and generates image data as a result of the processing.

Auxiliary storage unit 220 is a device for storing data used by control unit 210. Auxiliary storage unit 220 may, for example, be a flash memory or a hard disk. Auxiliary storage unit 220 may alternatively include a detachable storage medium such as a memory card, and a reader/writer therefor. Auxiliary storage unit 220 is capable of storing programs to be executed by control unit 210, and data acquired via network communication unit 240 or terminal communication unit 250. Auxiliary storage unit 220, for example, is capable of storing a downloaded game, which is sold online. Auxiliary storage unit 220 is also capable of storing course data of a game.

Disk drive 230 is a unit for reading data stored in an optical disk, which stores, for example, data necessary to execute a game, such as a game program. Disk drive 230 may read data from another type of storage medium such as a magnet-optical disk or a semiconductor memory.

Network communication unit 240 is a unit for communicating with network 500. Network communication unit 240 exchanges data with server device 100 under control of control unit 210.

Terminal communication unit 250 is a unit for communicating with controller 300. Terminal communication unit 250 may use any wireless communication method such as Wi-Fi (registered trademark), Bluetooth (registered trademark), or infrared communication.

AV interface unit 260 is a unit for providing image data and audio data to TV 400. AV interface unit 260 includes one or more interfaces such as a high-definition multimedia interface (HDMI, registered trademark) terminal or a component terminal.

Controller 300 is a portable input terminal for a user to hold and operate. Controller 300 has a display area, which enables controller 300 to serve as a display device. Controller 300 may exchange data with main body device 200 by wireless communication, or may be connected to main body device 200 by a wire.

Figure 4:
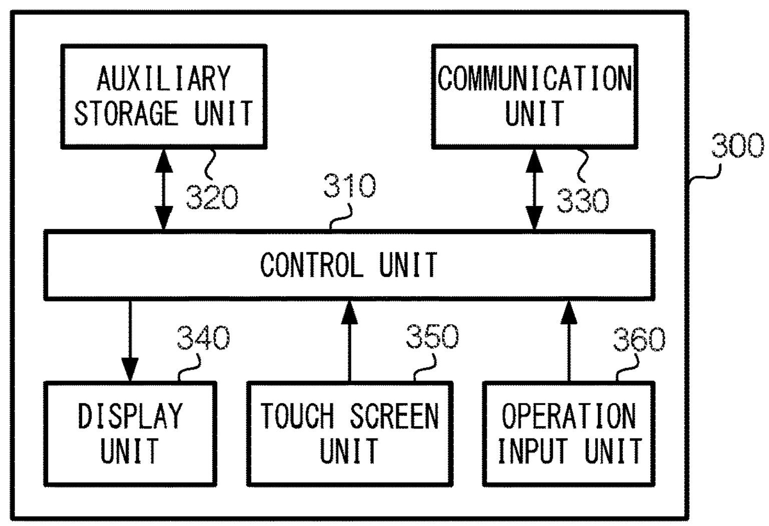
FIG. 4 shows an example of a hardware configuration of controller 300.

FIG. 4 is a block diagram showing an example of a hardware configuration of controller 300. Controller 300 includes control unit 310, auxiliary storage unit 320, communication unit 330, display unit 340, touch screen unit 350, and operation input unit 360.

Control unit 310 is a unit for controlling operation of components of controller 300. Control unit 310 includes a processing unit such as a CPU, a main memory, and an input-output interface for exchanging information with components of controller 300. Control unit 310 executes a program to control display of an image and exchange of data with main body device 200.

Auxiliary storage unit 320 is a device for storing data used by control unit 310. Auxiliary storage unit 320 may, for example, be a flash memory. Auxiliary storage unit 320 may alternatively include a detachable storage medium such as a memory card, and a reader/writer therefor.

Communication unit 330 is a unit for communicating with main body device 200. Communication unit 330 includes an antenna for wirelessly communicating with main body device 200.

Display unit 340 is a device for displaying an image. Display unit 340 includes a display panel, each pixel of which is constituted by a liquid crystal element or an organic electroluminescence (EL) element, and a drive circuit for driving the display panel. Display unit 340 displays an image according to image data provided by control unit 310 in a predetermined display area of the display panel.

Touch screen unit 350 is a unit for detecting a user's input operation. Touch screen unit 350 is a unit for generating and providing coordinate information representing a position in the display area of display unit 340. Touch screen unit 350 includes a sensor arranged over the display area, and a control circuit for generating coordinate information representing a position detected by the sensor and for providing the coordinate information to control unit 310. Touch screen unit 350 may be a resistive touch screen or a capacitive touch screen. Touch screen unit 350 may detect an input operation performed using a user's finger, or an input operation performed using a touch pen or a stylus.

Operation input unit 360 is another unit for detecting a user's input operation. Operation input unit 360 includes keys or switches that can be pressed by a user. Operation input unit 360 provides control unit 310 with input operation information according to a user's input operation, which information represents, for example, whether a key is being pressed.

TV 400 is a display device for displaying an image such as a game screen. TV 400 is connected to main body device 200. TV 400 displays an image under control of main body device 200. TV 400 may be replaced with another display device such as a projector.

1-1-3. Server Device 100

Figure 5:
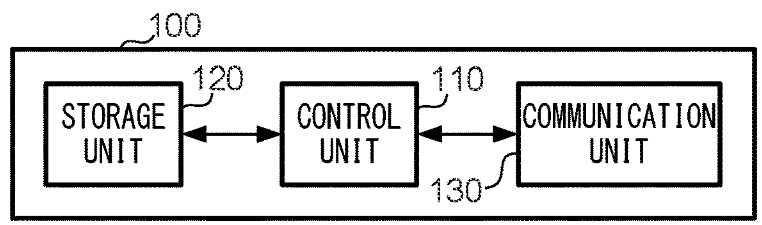
FIG. 5 shows an example of a hardware configuration of server device 100.

FIG. 5 is a block diagram showing an example of a hardware configuration of server device 100. Server device 100 is a computer device that enables users of gaming system 20 to share course data of a game. Server device 100 is an example of an information-processing device. Server device 100 includes control unit 110, storage unit 120, and communication unit 130.

Control unit 110 is a unit for controlling operation of server device 100. Control unit 110 includes a processing unit such as a CPU and a main memory. Control unit 110 executes a program to control operation of components of server device 100.

Storage unit 120 is a device for storing data. Storage unit 120 is, for example, a storage medium such as a hard disk. Storage unit 120 may be detachable from server device 100, or may be installed in another device, which can be accessed by server device 100 over network 500. Storage unit 120 stores course data shared between users of gaming system 20. Storage unit 120 also stores databases (a database will be hereinafter referred to as "DB") by which users are able to share course data.

FIG. 6 is a diagram showing an example of course information DB 121. Course information DB 121 is a database storing information on courses of a game. Each record constituting course information DB 121 includes fields of a course ID, a course name, a creator, a recommendation level, and the number of plays. A course ID is identification data of a course. A course name is a name of a course. A creator is a user who has created a course. The field of a creator stores user ID, which is identification data of a user. A recommendation level is a value indicative of a degree of recommendation for a course. Specifically, a recommendation level corresponds to the number of users who recommend a course. In other words, a recommendation level shows the number of users who indicated a course to be favorable. A higher recommendation level means a higher evaluation of a course. The number of plays is the number of times the course has been played.

FIG. 7 is a diagram showing an example of recommendation information DB 122. Recommendation information DB 122 is a database storing, for each user, information on courses that the user has recommended or evaluated. Each record constituting recommendation information DB 122 includes fields of user ID and recommended course ID. User ID is identification data of a user who has recommended or evaluated a course. Recommended course ID is ID of a course that a user has recommended or evaluated. The field of recommended course ID stores IDs of courses, relative to which a user has performed a predetermined input operation (described later).

FIG. 8 is a diagram showing an example of comment DB 123. Comment DB 123 is a database storing data relevant to comments input by users for each course. Each record constituting comment DB 123 includes fields of course ID, user ID, and a comment. Course ID is identification data of a course to which a comment is directed. User ID is identification data of a user who has made a comment. A comment is a content of a comment input by a user. A comment may be represented by text data, or may be represented by image data or video data.

Communication unit 130 is a unit for connecting to network 500 to exchange data with gaming system 20.

Figure 9:
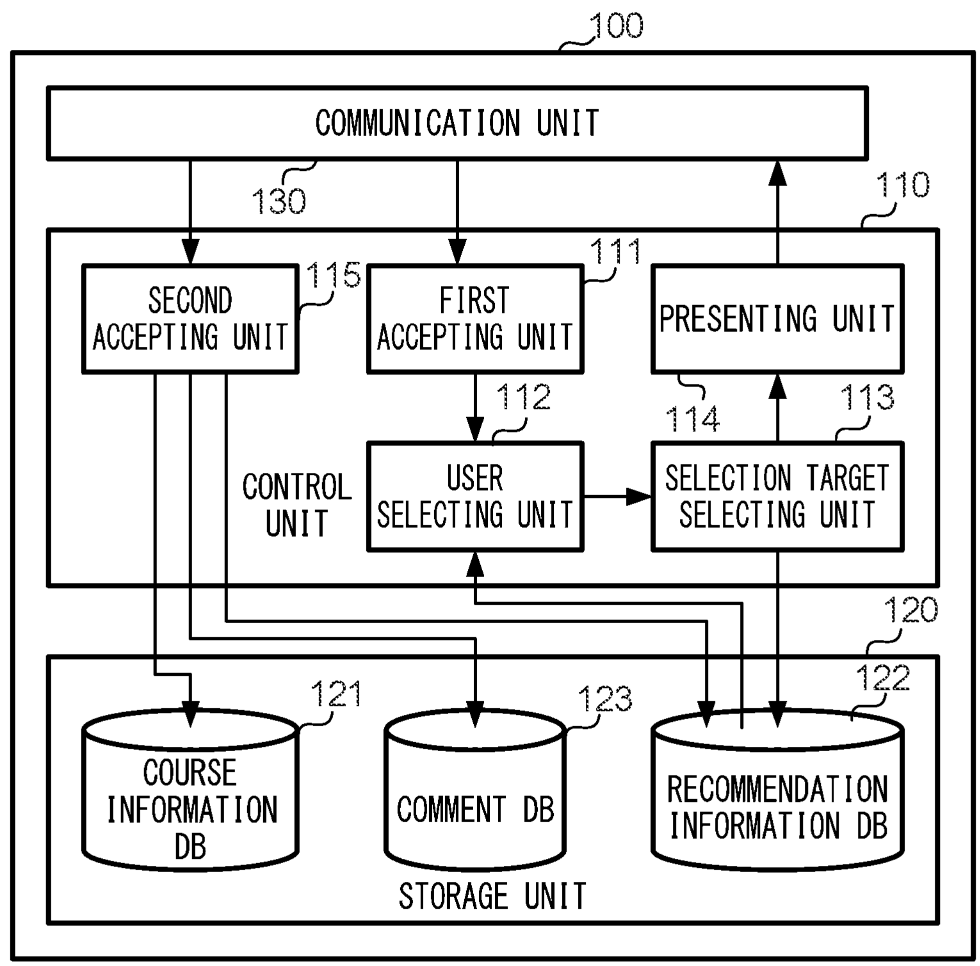
FIG. 9 shows an example of a functional configuration of server device 100.

FIG. 9 is a block diagram showing an example of a functional configuration of server device 100. Control unit 110 of server device 100 executes a predetermined program to provide functions of first accepting unit 111, user selecting unit 112, selection target selecting unit 113, presenting unit 114, and second accepting unit 115. The functions relate to a user basis extracting process (described later) in particular.

First accepting unit 111 accepts from a user an instruction to select one or more of plural selection targets. A selection target as used in the present exemplary embodiment refers to a content relevant to a game. Specifically, a selection target refers to a content representing a course (or a stage) of a game, which has been created by a user. The content is, for example, a content representing a course that has been cleared by a user.

User selecting unit 112 selects one or more of plural other users, who have recommended or evaluated a selection target, selection of which has been accepted by first accepting unit 111. The term "evaluate" as used herein refers to judging the significance or value of a selection target. In a narrow sense, the term refers to acknowledging the significance or value of a selection target. User selecting unit 112, specifically, selects one or more users, who are associated in recommendation information DB 122 with a course of a game, selection of which has been accepted by first accepting unit 111. When doing so, user selecting unit 112 selects another or other users, the number of which is not more than a predetermined number. User selecting unit 112 also randomly selects another or other users. In another exemplary embodiment, user selecting unit 112 may select another or other users according to a predetermined rule other than the random method.

Selection target selecting unit 113 selects one or more selection targets that another user selected by user selecting unit 112 has recommended or evaluated. When doing so, selection target selecting unit 113 may select plural selection targets. In particular, selection target selecting unit 113 may select plural selection targets that do not overlap each other.

Selection target selecting unit 113 selects one or more selection targets, relative to which another user selected by user selecting unit 112 has performed a predetermined input operation to make a recommendation. Selection target selecting unit 113 alternatively selects one or more selection targets, relative to which the selected other user has performed a predetermined input operation to make an evaluation (especially, an input operation to make a favorable evaluation). The predetermined input operation as used herein refers to, for example, an input operation to select a predetermined display element, which is displayed on a screen in association with the one or more selection targets.

Selection target selecting unit 113 selects one or more selection targets, relative to which another user selected by user selecting unit 112 has made a recommendation or evaluation while or after using the selection target. In a case where a selection target is a content relevant to a game, selection target selecting unit 113 selects one or more contents, relative to which another user selected by user selecting unit 112 has made a recommendation or evaluation while or after playing the game.

Selection target selecting unit 113, specifically, selects one or more courses, which are associated in recommendation information DB 122 with another user selected by user selecting unit 112. When doing so, selection target selecting unit 113 randomly selects one or more courses. In another exemplary embodiment, selection target selecting unit 113 may select one or more courses according to a predetermined rule other than the random method.

Presenting unit 114 presents, to a user, information on one or more selection targets selected by selection target selecting unit 113. In a case where selection target selecting unit 113 has selected plural selection targets, presenting unit 114 presents information on the plural selection targets to a user. Presenting unit 114, when presenting information on one or more selection targets to a user, may present the information together with information on a selection target, selection of which has been accepted by first accepting unit 111. For example, presenting unit 114 may include both items of information in screen data representing a screen to be presented to the user.

Second accepting unit 115 accepts from a user an instruction to recommend or evaluate a selection target. The user is, for example, a user whose selection of a selection target has been accepted by first accepting unit 111. In this case, selection target selecting unit 113, when selecting one or more selection targets, excludes one or more selection targets recommended or evaluated by the user from one or more selection targets recommended or evaluated by another user selected by user selecting unit 112.

1-2. Operation

An operation of information-sharing system 10 will be described. Specifically, a game execution process for executing a game in gaming system 20 will be described.

Figure 10:
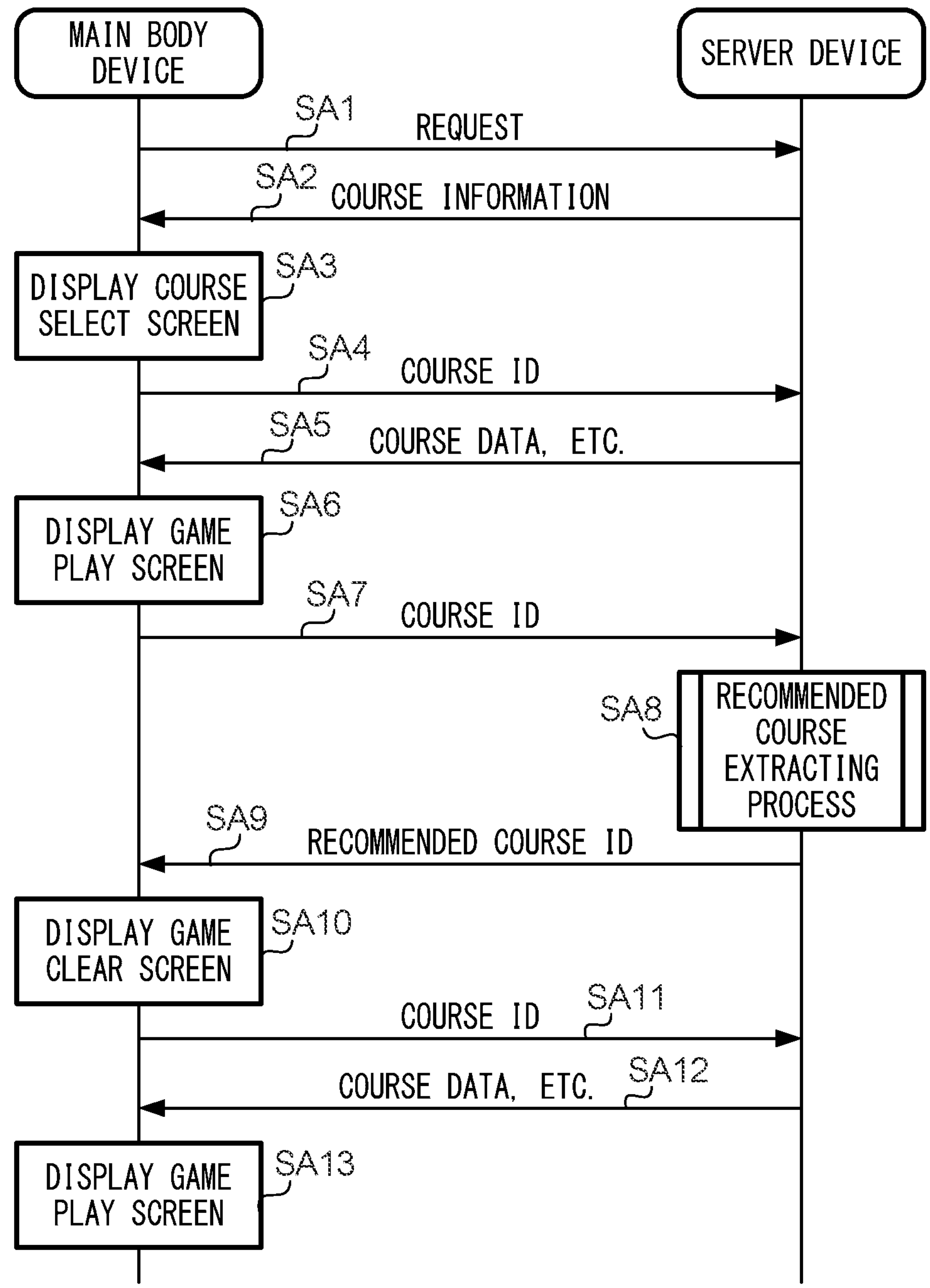
FIG. 10 shows an example of a sequence chart showing a game execution process.

FIG. 10 is a sequence chart showing an example of the game execution process. In the process, main body device 200, in response to a user's instruction to execute a game application, sends, to server device 100, a request for course information to be displayed on a course selection screen of the game (step Sa1). Server device 100, on receipt of the request, acquires course information from course information DB 121 to send the information to main body device 200 (step Sa2). Main body device 200, on receipt of the course information, causes controller 300 and/or TV 400 to display a course selection screen based on the course information (step Sa3).

Figure 11:
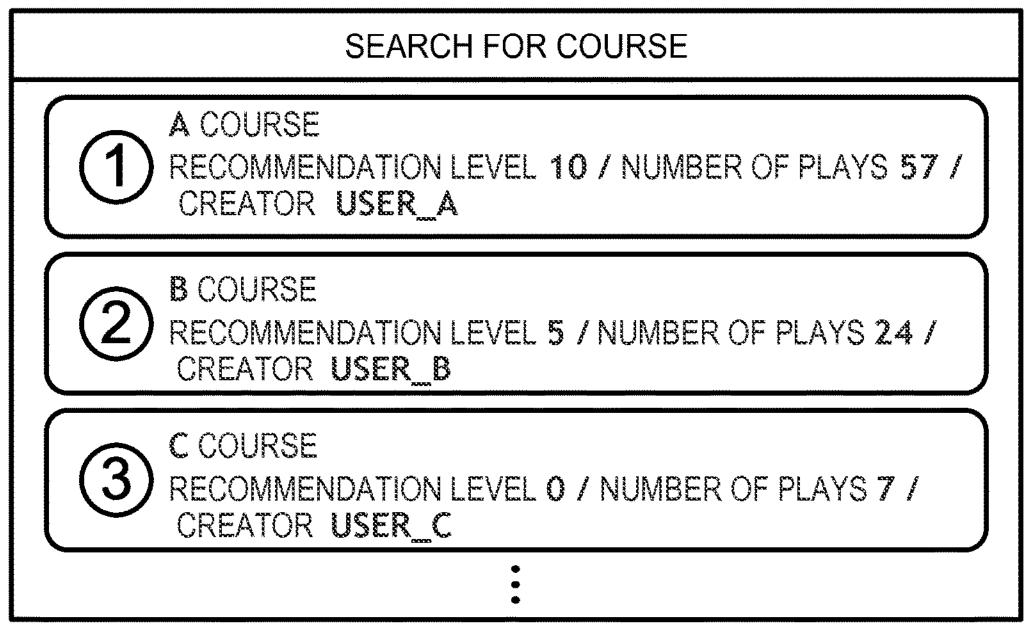
FIG. 11 shows an example of a course selection screen.

FIG. 11 is a diagram showing an example of the course selection screen. The screen shows items of course information in a descending order of a recommendation level so that each of them is selectable. Each item of course information, specifically, includes data on a course name, user ID of a creator, a recommendation level, and the number of plays. The screen may additionally show an image (for example, a thumbnail) showing a course or an image (for example, an avatar) showing a creator. It is to be noted that items of course information may be shown in an ascending or descending order according to a created date and time of a course, or may be shown in an ascending or descending order according to the number of plays of a course.

When the user selects one of the courses on the displayed course selection screen, main body device 200 sends, to server device 100, a request for course data, including course ID of the selected course (step Sa4). Server device 100, on receipt of the request, acquires course data identified by the received course ID from storage unit 120. Server device 100 also acquires comment data associated with the received course ID from comment DB 123. Server device 100 sends the acquired course data and comment data to main body device 200 (step Sa5). Main body device 200, on receipt of the course data and the comment data, executes the game application based on the received course data to cause controller 300 and/or TV 400 to display a game play screen (step Sa6).

Figure 12:
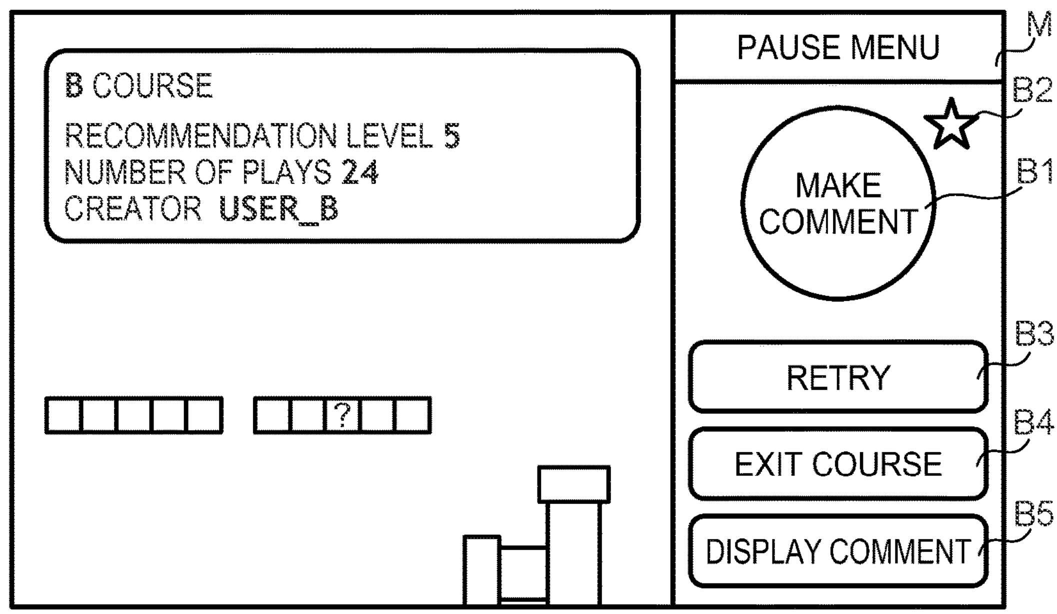
FIG. 12 shows an example of a game play screen.

FIG. 12 is a diagram showing an example of the game play screen. The screen is a screen displayed when the game is paused, in particular. The screen shows course information over a play screen of the game. Specifically, the screen shows a course name, user ID of a creator, a recommendation level, and the number of plays. The screen may additionally show an image (for example, an avatar) showing a creator. The screen also shows pause menu M, which includes comment button B1, recommend button B2, retry button B3, game quit button B4, and comment display button B5.

Comment button B1 is a button for inputting a comment on the course. In other words, comment button B1 is a button for making an evaluation of the course. Specifically, comment button B1 is a button for calling an input field for inputting a comment. Comment data inputted by selecting comment button B1 is stored in comment DB 123 of server device 100 in association with course ID of the course and user ID. User ID of a user whose comment has been accepted is associated with course ID of the course in recommendation information DB 122 of server device 100 as user ID of a user who has evaluated the course. Acceptance of a comment may increment a value of a recommendation level associated with a course ID of the course in course information DB 121 of server device 100.

Recommend button B2 is a button for indicating an intention to recommend the course. Selection of recommend button B2 increments a value of a recommendation level associated with course ID of the course in course information DB 121 of server device 100. User ID of a user who has selected recommend button B2 is associated with course ID of the course in recommendation information DB 122 of server device 100 as user ID of a user who recommends the course.

Retry button B3 is a button for restating the course from the beginning. Game quit button B4 is a button for quitting play of the course. Comment display button B5 is a button for displaying comments input by other users in connection with the course.

When the user clears the course, main body device 200 sends, to server device 100, a request for recommend information for recommending to the user courses other than the cleared course (step Sa7). When doing so, main body device 200 also sends course ID of the cleared course to server device 100. Server device 100, on receipt of the request, performs a recommended course extracting process to extract one or more courses to be recommended to the user (step Sa8).

Figure 13:
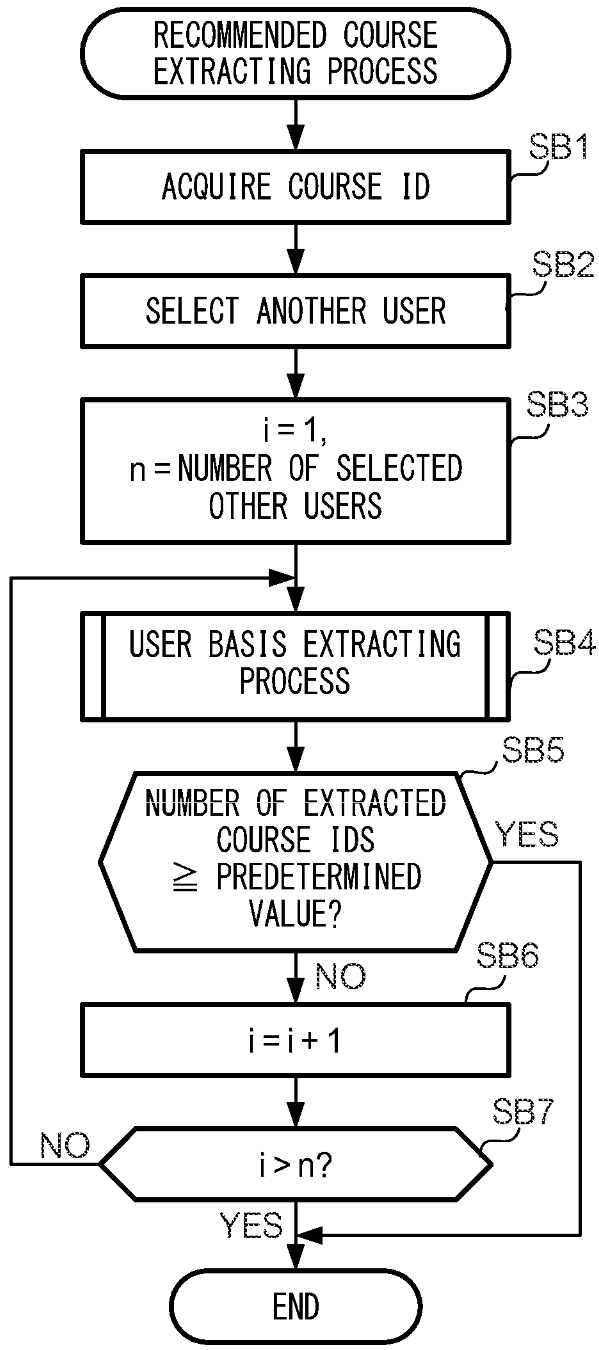
FIG. 13 shows an example of a flowchart showing a recommended course extracting process.

FIG. 13 is a flowchart showing an example of the recommended course extracting process. In the process, server device 100 extracts one or more courses that another user, who has preferences similar to those of the user who has cleared the course, has recommended or evaluated. The total number of courses to be extracted is a parameter that should be determined based on an acceptable processing time. In the present exemplary embodiment, the total number is four.

At step Sb1 of the process, control unit 110 of server device 100 acquires course ID of the course cleared by the user. Subsequently, control unit 110 selects other users who have recommended or evaluated the course identified by the acquired course ID (step Sb2). Specifically, control unit 110 extracts user IDs associated with the acquired course ID in recommendation information DB 122. When doing so, control unit 110 randomly selects user IDs. The total number of user IDs to be extracted is a parameter that should be determined based on an acceptable processing time. In the present exemplary embodiment, the total number is six.

Subsequently, control unit 110 extracts, for each of the selected other users, a course recommended or evaluated by the selected user. Course ID of the extracted course is, in the present exemplary embodiment, recorded in course ID list L stored in a RAM of control unit 110. To perform the process, control unit 110 sets parameter i of a loop processing to the initial value "1," and sets final value n to the number of selected users (in the present exemplary embodiment, "6") (step Sb3). Control unit 110 performs, for i-th user ID of the extracted six user IDs, a user basis extracting process, which will be described below (step Sb4).

Figure 14:
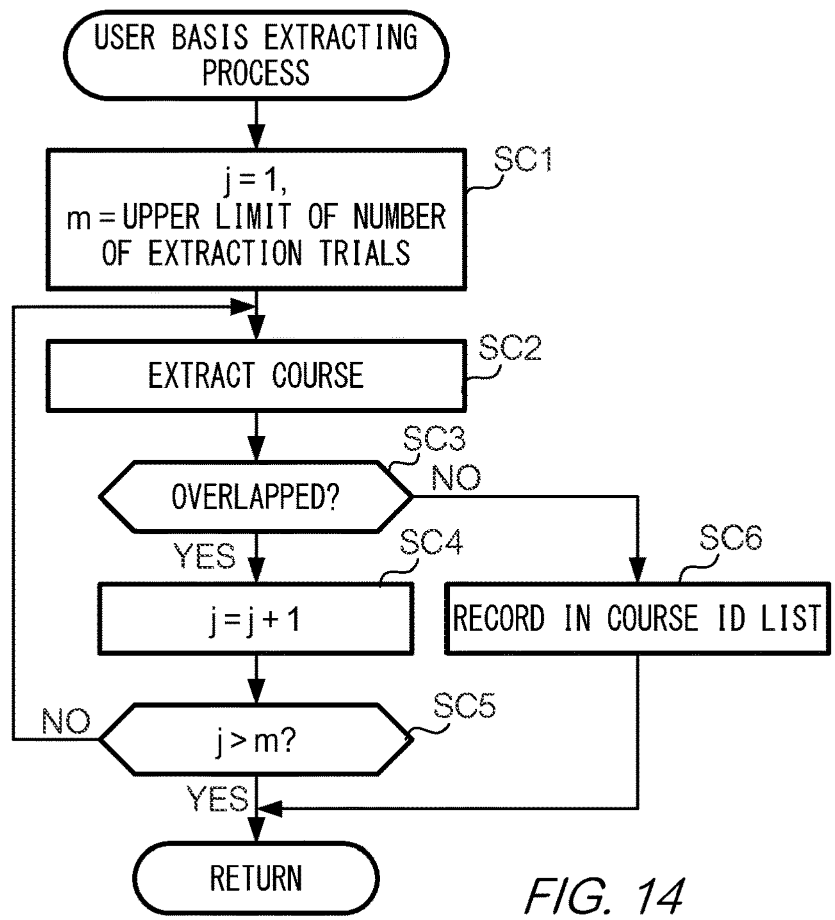
FIG. 14 shows an example of a flowchart showing a user basis extracting process.

FIG. 14 is a flowchart showing an example of the user basis extracting process. The total number of courses to be extracted for another user subjected to the process is a freely selected parameter. In the present exemplary embodiment, the total number is one.

Control unit 110 initially sets parameter j of a loop processing to the initial value "1," and sets final value m to an upper limit of the number of trials in order to set the upper limit of the number of extraction trials per another user subjected to the process (step Sc1). The upper limit is a freely-selected parameter. In the present exemplary embodiment, the upper limit is ten.

Subsequently, control unit 110 extracts a course recommended or evaluated by the other user subjected to the process (step Sc2). Specifically, control unit 110 extracts course ID associated recommendation information DB 122 with user ID of the other user subjected to the process. When doing so, control unit 110 randomly selects an item of course ID.

After extracting an item of course ID, control unit 110 determines whether the extracted course ID overlaps the course ID acquired at step Sb1 or any of course IDs recorded in course ID list L (step Sc3). When the determination confirms no overlap (step Sc3: NO), control unit 110 records the extracted course ID in course ID list L (step Sc6), and thereafter ends the user basis extracting process.

On the other hand, when the determination confirms any overlap (step Sc3: YES), storage unit 120 increments the value of parameter j (step Sc4), and thereafter determines whether the value of parameter j exceeds final value m (step Sc5). When the determination confirms that the value of parameter j is smaller than or equal to final value m (step Sc5: NO), namely, when the number of extraction trials has not reached the upper limit, control unit 110 returns to the processing of step Sc2. On the other hand, when the determination confirms that the value of parameter j is greater than final value m (step Sc5: YES), namely, when the number of extraction trials has reached the upper limit, control unit 110 ends the user basis extracting process.

The foregoing is a description of the user basis extracting process.

FIG. 13 is referred to again. After ending the user basis extracting process, control unit 110 refers to course ID list L to determine whether the number of extracted course IDs has reached a predetermined value (step Sb5). In the present exemplary embodiment, control unit 110 determines whether the number of extracted course IDs has reached the value "4." When the determination confirms that the number of extracted course IDs has reached the predetermined value (step Sb5: YES), control unit 110 ends the recommended course extracting process.

On the other hand, when the determination confirms that the number of extracted course IDs has not reached the predetermined value (step Sb5: NO), control unit 110 increments the value of parameter i (step Sb6), and thereafter determines whether the value of parameter i exceeds final value n (step Sb7). When the determination confirms that the value of parameter i is smaller than or equal to final value n (step Sb7: NO), namely, when another user remains to be subjected to the process, control unit 110 returns to the processing of step Sb4. On the other hand, when the determination confirms that the value of parameter i is greater than final value n (step Sb7: YES), namely, when no user remains to be subjected to the process, control unit 110 ends the recommended course extracting process.

The foregoing is a description of the recommended course extracting process.

FIG. 10 is referred to again. After ending the recommended course extracting process, server device 100 sends course IDs extracted as a result of the process to main body device 200 (step Sa9). Main body device 200, on receipt of the course IDs, generates a game clear screen based on the course IDs to cause controller 300 and/or TV 400 to display the screen (step Sa10).

Figure 15:
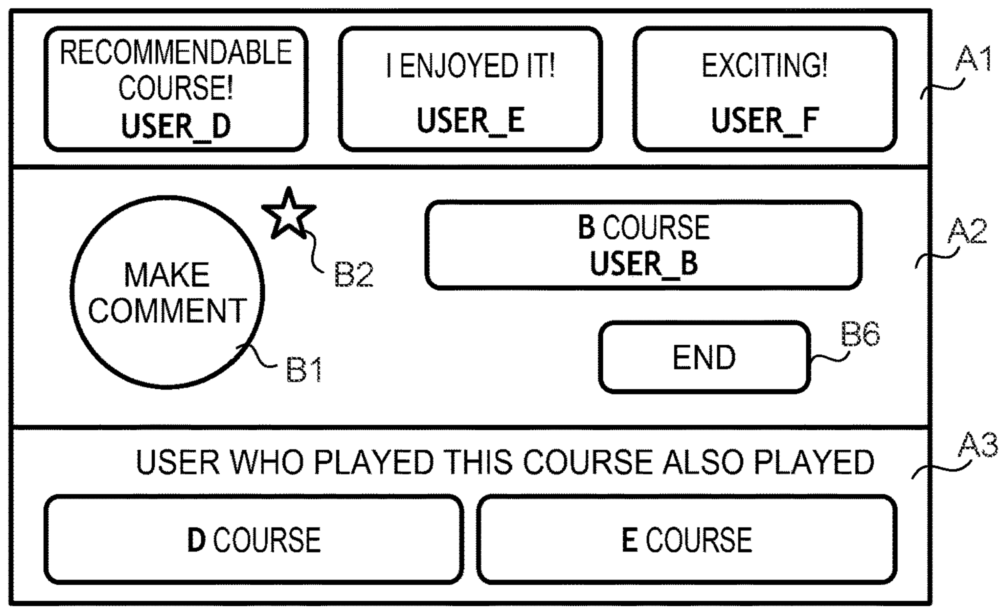
FIG. 15 shows an example of a game clear screen.

FIG. 15 is a diagram showing an example of the game clear screen. The screen includes comment display area A1, course information display area A2, and recommended course display area A3. Comment display area A1 shows comments on the cleared course based on the comment data received at step Sa5. Comment display area A1 shows each comment together with user ID of a user who has made the comment. Comment display area A1 shows sets of a comment and user ID so that they flow in a horizontal direction of the screen. In other words, comment display area A1 automatically scrolls the sets of a comment and user ID. Comment display area A1 repeatedly shows the sets of a comment and user ID. Comment display area A1 may show an image showing a user (for example, an avatar) together with user ID of the user.

Course information display area A2 shows comment button B1, recommend button B2, and game end button B6, together with a course name and user ID of a creator. The functions of comment button B1 and recommend button B2 are the same as those displayed on the above-mentioned game play screen. Course information display area A2 may show an image indicating a user (for example, an avatar) together with user ID of the user. Game end button B6 is a button for ending play of the course.

Recommended course display area A3 shows course names identified by the course IDs received from server device 100 at step Sa9, so that any of the course names are selectable. Each course name is, for example, identified by referring to the course information received from server device 100 at step Sa1. Recommended course display area A3 shows the course names so that they flow in a horizontal direction of the screen. In other words, recommended course display area A3 automatically scrolls the course names. Recommended course display area A3 repeatedly shows the course names. Recommended course display area A3 may additionally show course information other than a course name. Recommended course display area A3 may additionally show an image (for example, a thumbnail) showing a course, or an image showing a creator (for example, an avatar).

When the user selects any one of the courses shown in recommended course display area A3, main body device 200 sends, to server device 100, a request for course data, including course ID of the selected course (step Sa11). Server device 100, on receipt of the request, acquires course data identified by the received course ID from storage unit 120. Server device 100 also acquires comment data associated with the received course ID from comment DB 123. Server device 100 sends the acquired course data and comment data to main body device 200 (step Sa12). Main body device 200, on receipt of the course data and the comment data, executes the game application based on the received course data to cause controller 300 and/or TV 400 to display a game play screen (step Sa13).

The foregoing is a description of the game execution process.

Information-sharing system 10 according to the present exemplary embodiment described in the foregoing recommends courses recommended or evaluated by other users who have the same preferences as the user, not courses merely played by the other users, which recommended courses are more likely to match preferences of the user. Namely, information-sharing system 10 improves precision of recommendation.

2. Modifications

The above exemplary embodiment may be modified as described below. Any two or more of the following modifications may be combined with each other.

2-1. Modification 1

In the above exemplary embodiment it is assumed that course data of a game is a selection target; however, a selection target may be a content other than course data. For example, a selection target may be an item of a game or a character (for example, an avatar or a part thereof) of a game. Alternatively, a selection target may be a commodity irrelevant to a game, instead of a content relevant to a game. A commodity as used herein refers to goods or a service that is subjected to a commercial transaction. Goods may be a tangible object or an intangible object such as a digital content. A commercial transaction includes not only sale and purchase, but also rental.

2-2. Modification 2

In the recommended course extracting process according to the above exemplary embodiment, control unit 110 of server device 100 that has failed to extract a predetermined number of courses as a result of the user basis extracting process performed for the other users selected at step Sb2, may additionally select another user, who is a user that can be selected at step Sb2, to perform the user basis extracting process for the selected user. Alternatively, control unit 110 may restart the recommended course extracting process from the beginning.

2-3. Modification 3

In the above exemplary embodiment it is assumed that a single device realizes the recommended course extracting process; however, plural devices that can access each other via a network may cooperate to realize the recommended course extracting process. Namely, an information-processing system may realize the recommended course extracting process.

2-4. Modification 4

A program for realizing the recommended course extracting process according to the above exemplary embodiment may be provided to server device 100 via a computer-readable non-transitory storage medium. A storage medium may be, for example, a magnetic storage medium such as a magnetic tape or a magnetic disk, an optical storage medium such as an optical disk, a magneto-optical storage medium, or a semiconductor memory. The program may be provided to server device 100 via a network such as the Internet.

What is claimed is:

1. An information-processing device including at least one processor and a memory storing computer program instructions, the computer program instructions when executed by the at least one processor causing the information-processing device to perform operations comprising:

selecting a first selection target from a plurality of selection targets in response to an instruction from a first user, each selection target in the plurality of selection targets having a respective set of recommendations and/or evaluations from plural users associated with it in stored information in a digital memory;

automatically selecting, from the stored information corresponding to plural users who the stored information indicate as having previously recommended or evaluated the selected first selection target, a second user who is not the first user;

automatically selecting, from the plurality of selection targets, one or more second selection targets that the stored information indicates as having previously been recommended or evaluated by the second user; and providing information on the selected one or more second selection targets for displaying to the first user.

2. The information-processing device according to claim 1, further comprising selecting one or more selection targets, relative to which the second user has performed a predetermined input operation to make a recommendation.

3. The information-processing device according to claim 1, further comprising selecting one or more selection targets, relative to which the second user has performed a predetermined input operation to make an evaluation.

4. The information-processing device according to claim 3, wherein the predetermined input operation is an input operation to make a favorable evaluation.

5. The information-processing device according to claim 3, wherein the predetermined input operation is an input operation to select a display element displayed on a screen in association with the selected one or more selection targets.

6. The information-processing device according to claim 1, further comprising selecting one or more of the second selection targets that the second user has recommended or evaluated while or after using the second selection targets.

7. The information-processing device according to claim 1, further comprising operations:

selecting plural selection targets that the second user has recommended or evaluated; and providing information on the selected plural selection targets to the first user.

8. The information-processing device according to claim 7, wherein the plural selection targets do not overlap each other.

9. The information-processing device according to claim 1, further comprising selecting plural other users other than the first user, the number of the plural other users being not more than a predetermined number.

10. The information-processing device according to claim 1, further comprising accepting from the first user an instruction to recommend or evaluate the selection target selected by the first user.

11. The information-processing device according to claim 1, further comprising selecting one or more, other than the first selection target selected by the first user, of the one or more second selection targets that the second user has recommended or evaluated.

12. The information-processing device according to claim 1, further comprising providing, to the first user, information on the first selection target selected by the first user, together with information on the one or more second selection targets.

13. The information-processing device according to claim 1, wherein the selection target is a content relevant to a game.

14. The information-processing device according to claim 13, wherein the content relevant to a game represents a stage, an item, or a character.

15. The information-processing device according to claim 13, further comprising selecting one or more selection targets that the second user has recommended or evaluated while or after playing the game.

16. The information-processing device according to claim 1, wherein the selection target is a content that has been created by one of the plural users.

17. An information-processing system, comprising:

a display device;

a digital memory; and at least one processor configured to:

select a first selection target from a plurality of selection targets in response to an instruction from a first user, each selection target in the plurality of selection targets having a respective set of recommendations and/or evaluations from plural users associated with it in stored information in the digital memory;

automatically select, from the stored information corresponding to plural users who the stored information indicate as having previously recommended or evaluated the selected first selection target, a second user who is not the first user;

automatically select, from the plurality of selection targets, one or more second selection targets that the stored information indicates as having previously been recommended or evaluated by the second user; and provide information on the selected one or more second selection targets for displaying on the display device to the first user.

18. A non-transitory storage medium storing a program for causing a computer including a memory storing computer program instructions to execute a process, the process comprising:

selecting a first selection target from a plurality of selection targets in response to an instruction from a first user, each selection target in the plurality of selection targets having a respective set of recommendations and/or evaluations from plural users associated with it in stored information in a digital memory;

automatically selecting, from the stored information corresponding to plural users who the stored information indicate as having previously recommended or evaluated the selected first selection target, a second user who is not the first user;

automatically selecting, from the plurality of selection targets, one or more second selection targets that the stored information indicates as having previously been recommended or evaluated by the second user; and providing information on the selected one or more second selection targets for displaying to the first user.

19. An information-processing method performed by at least one processor of an information-processing device including a memory storing computer program instructions, the method comprising:

selecting a first selection target from a plurality of selection targets in response to an instruction from a first user, each selection target in the plurality of selection targets having a respective set of recommendations and/or evaluations from plural users associated with it in stored information in a digital memory;

automatically selecting, from the stored information corresponding to plural users who the stored information indicate as having previously recommended or evaluated the selected first selection target, a second user who is not the first user;

automatically selecting, from the plurality of selection targets, one or more second selection targets that the stored information indicates as having previously been recommended or evaluated by the second user; and providing information on the selected one or more second selection targets for displaying to the first user.

* * * * *